United States Patent
Zöllner et al.

(10) Patent No.: US 9,840,255 B2
(45) Date of Patent: Dec. 12, 2017

(54) METHOD AND CONTROL UNIT FOR A DRIVETRAIN

(71) Applicant: ZF Friedrichshafen AG, Friedrichshafen (DE)

(72) Inventors: Tobias Zöllner, Lindau (DE); Karl Franz, Konstanz (DE); Anatol Weidenbach, Nonnenhorn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 68 days.

(21) Appl. No.: 15/006,488

(22) Filed: Jan. 26, 2016

(65) Prior Publication Data

US 2016/0214615 A1    Jul. 28, 2016

(30) Foreign Application Priority Data

Jan. 26, 2015    (DE) .......................... 10 2015 201 269

(51) Int. Cl.
*B60W 30/19* (2012.01)
*B60W 10/04* (2006.01)
(Continued)

(52) U.S. Cl.
CPC ............ *B60W 30/19* (2013.01); *B60W 10/04* (2013.01); *B60W 10/11* (2013.01); *B60W 20/30* (2013.01); *F16H 35/00* (2013.01)

(58) Field of Classification Search
CPC .... Y02T 10/6286; B60W 30/19; B60W 20/30
See application file for complete search history.

(56) References Cited

U.S. PATENT DOCUMENTS 6,602,164 B2 * 8/2003 Yoshiaki .................. B60K 6/48
                                                    180/65.25
6,634,247 B2   10/2003 Pels et al.
(Continued)

FOREIGN PATENT DOCUMENTS

DE              10133695 A1    3/2002
DE        102005021869 A1    12/2005
(Continued)

OTHER PUBLICATIONS

German Patent Office Search Report, dated Oct. 30, 2015.

*Primary Examiner* — Sherry L Estremsky
(74) *Attorney, Agent, or Firm* — Dority & Manning, P.A.

(57) ABSTRACT

A method provides for operating a drive train having several drive assemblies, a transmission and an output A first drive assembly acts on a first transmission shaft of the transmission, and a second drive assembly acts on a second transmission shaft. The transmission includes several shift elements, whereas an output torque depending on a driver's requested torque is provided at the output. For the opening of a shift element the shift element is placed without load. The probability of a gearshift request is determined on the control side by a shifting strategy. If the probability of a gearshift request is greater than the defined threshold, a torque provided by a first drive assembly and the second drive assembly is changed on the control side in advance of an actual gearshift request, while maintaining the driver's requested torque at the output, in such a manner that a torque, which is transferred by a shift element to be opened for the gearshift that is detected to be probable, is reduced as much as possible in order to minimize the time required after the actual gearshift request for the execution of the gearshift.

8 Claims, 3 Drawing Sheets

(51) Int. Cl.
*B60W 10/11* (2012.01)
*F16H 35/00* (2006.01)
*B60W 20/30* (2016.01)

(56) References Cited

U.S. PATENT DOCUMENTS

| | | | |
|---|---|---|---|
| 7,090,613 B2 | 8/2006 | Heap et al. | |
| 7,228,926 B2* | 6/2007 | Takami | B60W 20/30 180/65.265 |
| 8,512,200 B2* | 8/2013 | Falkenstein | B60K 6/52 180/65.265 |
| 8,608,617 B2* | 12/2013 | Stervik | B60K 6/48 477/3 |
| 9,457,646 B2* | 10/2016 | Zoellner | B60K 6/387 |
| 2007/0266711 A1 | 11/2007 | Falkenstein et al. | |
| 2016/0214599 A1* | 7/2016 | Doering | B60W 30/19 |

FOREIGN PATENT DOCUMENTS

| | | |
|---|---|---|
| DE | 102004044507 A1 | 3/2006 |
| DE | 102011080068 A1 | 1/2013 |
| DE | 102012218227 A1 | 5/2013 |

\* cited by examiner

METHOD AND CONTROL UNIT FOR A DRIVETRAIN

FIELD OF THE INVENTION

The invention relates to a method and a control device for operating a drive train.

BACKGROUND OF THE INVENTION

Drive trains of hybrid vehicles comprise multiple drive assemblies, namely, a first drive assembly formed as an internal combustion engine, a second drive assembly formed as an electric motor, a transmission, and an output. With such a drive train, the first drive assembly acts on a first transmission shaft of the transmission, whereas the second drive assembly acts on a second, different transmission shaft of the transmission. The transmission of the drive assembly includes multiple shift elements, which are typically designed as frictional-locking shift elements, such as, for example, clutches or brakes. At the output of the drive train, an output torque depending on a driver's requested torque is provided. In defined operating situations of such a drive train, it is necessary to open a previously locked shift element of the transmission. If a frictional-locking shift element is to be opened, this can occur in a simple manner by the fact that the frictional-locking shift element is brought into slip. This gives rise to friction torques or drag torques, which have negative effects on consumption. Therefore, in transmissions of a drive train, frictional-locking shift elements are being increasingly replaced by positive-locking shift elements, such as claw shift elements. However, such positive-locking shift elements, so that they can be opened, must be transferred into a load-free state or placed without load.

DE 10 2011 080 068 A1 discloses a method for performing a gearshift in a transmission of a power train, with which a first drive assembly formed as an internal combustion engine acts on a transmission input shaft and a second drive assembly formed as an electric motor acts on a transmission shaft provided by a planetary gear stage of the transmission. For executing a power shift, it is known to place a shift element to be disengaged in a load-free condition. Time is required to place the shift element in such a condition; this increases the time required to carry out the gearshift.

SUMMARY OF THE INVENTION

There is a need for a method of operating a drive train with at least two drive assemblies engaging at different transmission shafts, namely a method, with the aid of which the time required for executing a gearshift can be shortened. Proceeding from this, the invention is subject to a task of providing a new method and a control device for operating a drive train. Additional objects and advantages of the invention will be set forth in part in the following description, or may be obvious from the description, or may be learned through practice of the invention.

This task is achieved through a method in accordance with the invention. The probability of a gearshift request is determined on the control aspect by a shifting strategy, whereas, if such probability is greater than a defined threshold, a torque provided by a first drive assembly and a second drive assembly is changed in the control aspect, in advance of an actual gearshift request, while maintaining the driver's requested torque at the output, in such a manner that a torque, which is transferred by a shift element to be opened for the gearshift that is detected to be probable, is reduced as much as possible, in order to minimize the time required after the actual gearshift request for the execution of the gearshift. In advance, the shift element to be opened is placed in a condition with a reduced load, by which the time required for the execution of the gearshift can be shortened.

Preferably, if the probability of a gearshift request is greater than a defined threshold, target torques are calculated in the control aspect for the first drive assembly and the second drive assembly, with the aid of which the shift element to be opened can be placed in a load-free condition while maintaining the driver's requested torque. There is an examination of whether at least one of such target torques violates a torque limit of the respective drive assembly. If it is determined that none of the target torques violate the respective torque limit, the first and second drive assemblies, in advance of the actual gearshift request, are guided in a torque-controlled manner to the respective target torque while maintaining the drivers requested torque at the output. If it is determined that at least one of the target torques violates the respective torque limit, the shift element to be opened is placed in a condition with reduced load in advance of the actual gearshift request.

Thereby, it can be ensured that, prior to the actual gearshift request, the output torque corresponds to the drivers requested torque, and the time required for executing the gearshift is shortened.

According to an additional embodiment of the invention, if at least one of the target torques violates the respective torque limit, the first and second drive assemblies are guided in a torque-controlled manner in the direction of the respective target torque, while maintaining the drivers requested torque at the output along the torque guide curves, until one of the drive assemblies reaches its torque limit, whereas, subsequently, the torques of the drive assemblies are kept constant. Only with the presence of the actual gearshift request is the shift element to be opened placed in a completely load-free condition by the torque of the other drive assembly, which has not reached its torque limit, being brought along in a torque-controlled manner to a target torque under the provision of an output torque that deviates from the drivers requested torque. This embodiment is advantageous if, as a result of reaching a torque limit for a drive assembly, the shift element to be opened in advance cannot be placed in a completely load-free condition.

According to an additional embodiment of the invention, the first transmission shaft, on which the first drive assembly acts, is a transmission input shaft of the transmission, whereas the second transmission shaft, on which the second drive assembly acts, is a transmission shaft of the transmission provided by a planetary stage of the transmission, and whereas a transmission output shaft of the transmission acts on the output. The invention is preferentially used in power-split transmissions; i.e., if there is a power splitting through one planetary stage between the drive assemblies engaging at different transmission shafts.

A control device in accordance with the invention for carrying out the method is also described herein.

BRIEF DESCRIPTION OF THE DRAWINGS

Embodiments of the invention are, without any limitation, more specifically described by means of the drawings. Thereby, the following is shown.

DETAILED DESCRIPTION

Figure 1:
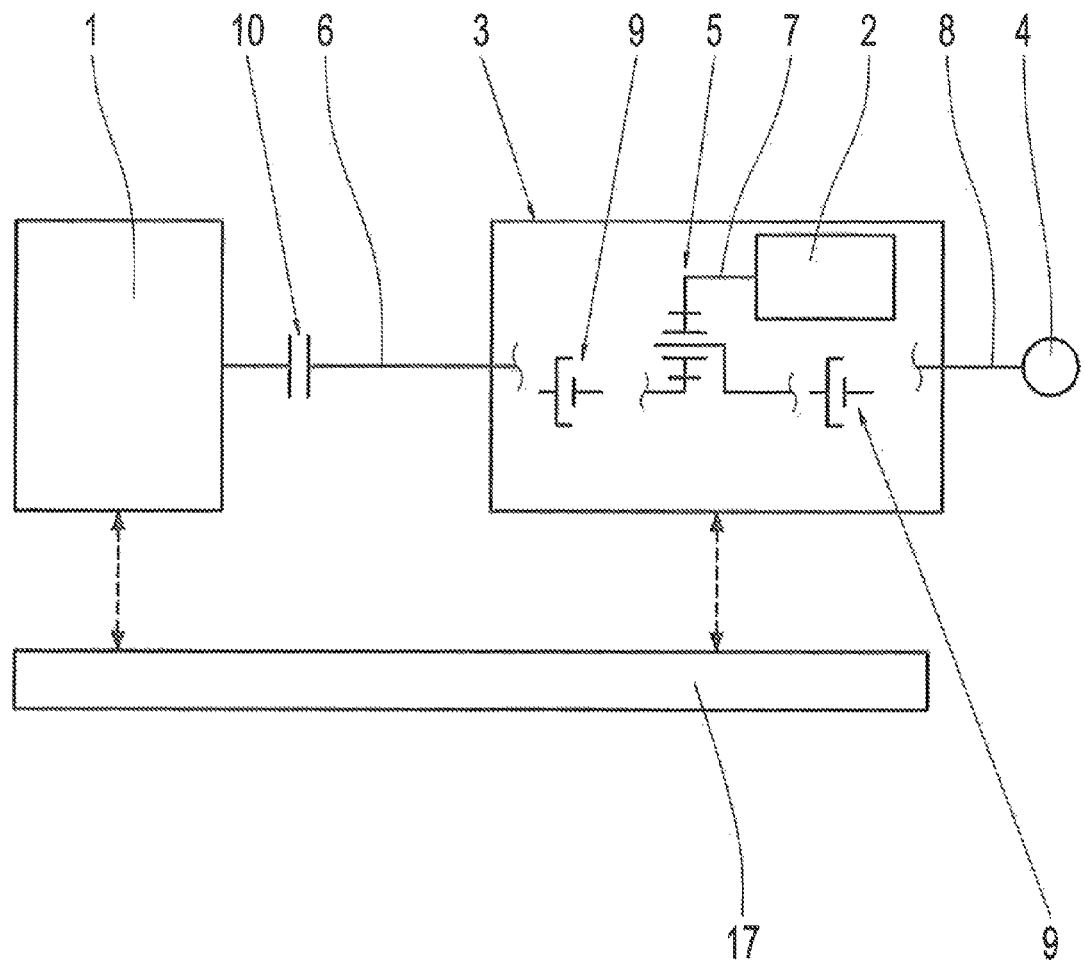
FIG. 1 is a diagram of a drive train.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

The invention relates to a method along with a control device for operating a drive train.

FIG. 1 shows a diagram of a drive train of a motor vehicle, with which the method in accordance with the invention and the control device in accordance with the invention are preferably used. The drive train of FIG. 1 comprises two drive assemblies 1, 2, a transmission 3, and an output 4.

The transmission 3 comprises at least one planetary stage 5 along with multiple shift elements 9. The shift elements 9 shown are positive-locking shift elements 9, such as claws.

The first drive assembly 1, which preferably is an internal combustion engine, acts on a first transmission shaft 6 of the transmission 3, whereas this first transmission shaft 6 is the transmission input shaft of the transmission 3. The first drive assembly 1 may alternatively be formed as a first electric motor.

The second drive assembly 2, which is preferably a second electric motor, acts on a second transmission shaft 7 of the transmission 3, whereas this second transmission shaft is a shaft internal to the transmission that, viewed in the direction of flow of the torque, is positioned between the transmission input shaft 6 and a transmission output shaft 8 of the transmission 3.

In the embodiment shown, this second transmission shaft 7, on which the second drive assembly 2 acts, is provided by the planetary stage 5; i.e., in the embodiment shown, by a ring gear of the same.

The transmission output shaft 8 is coupled to the output 4. In the embodiment shown, a disconnect clutch 10 is positioned between the first drive assembly 1 and the transmission input shaft 6, through which the first drive assembly 1 can be uncoupled from the transmission input shaft 6.

As already stated, in the embodiment shown, the first drive assembly 1 is preferably an internal combustion engine, which provides a drive assembly external to the transmission. The second drive assembly 2 is preferably a second electric motor, which provides a drive assembly internal to the transmission. Such a second electric motor can be operated as a motor and a generator.

It should be noted that the method can also be used if more than two drive assemblies are present, for example, an internal combustion engine and two or three or more electric motors.

As already stated, the transmission 3 comprises three shift elements 9, whereas two such shift elements 9 are shown by way of example in FIG. 1; i.e., a shift element 9, which is positioned between the transmission input shaft 6 and the planetary stage 5, and an additional shift element 9, which is positioned between the planetary stage 5 and the transmission output shaft 8. In each engaged gear of the transmission 3, a first number of shift elements 9 are locked and a second number of shift elements 9 are opened.

To execute a gear change, at least one previously locked shift element 9 must be opened and at least one previously opened shift element 9 must be locked. In particular, if a shift element 9 to be opened is designed as a positive-locking shift element 9, the same must be placed in a load-free condition, such that the same can be opened.

The present invention concerns a method, with the aid of which the time required for executing a gearshift can be shortened as much as possible.

Thus, in accordance with the invention, the probability of a gearshift request is determined in the control aspect by a shifting strategy.

If the probability of a gearshift request is greater than a defined threshold, a torque distribution between the drive assemblies 1 and 2 is changed on the control side in advance of an actual gearshift request, while maintaining the driver's requested torque at the output 4. Thereby, while maintaining the drivers requested torque at the output 4, a torque provided by the first drive assembly 1 and the second drive assembly 2 is changed in such a manner that a torque, which is transferred by a positive-locking shift element 9 to be opened for the gearshift that is detected to be probable, is reduced as much as possible. In doing so, the time required after actual gearshift request for the execution of the gearshift is minimized.

Accordingly, in accordance with the invention, it is provided that a shift strategy determines whether a gear change or a gearshift, as the case may be, is imminent in the transmission 3. This can be derived, for example, from an acceleration behavior or a deceleration behavior, as the case may be, of the motor vehicle. Subsequently, the positive-locking shift element to be opened for the probable gear change is then placed in a load-free condition. This is carried out through a power splitting through the planetary stage, such that the output torque remains unchanged. If the shifting strategy actually requests the execution of a gearshift, the positive-locking shift element to be opened is placed in a load-free condition as far as possible already at such point in time, such that the time required after the actual gearshift request to execute the gearshift can be minimized.

Figure 2:
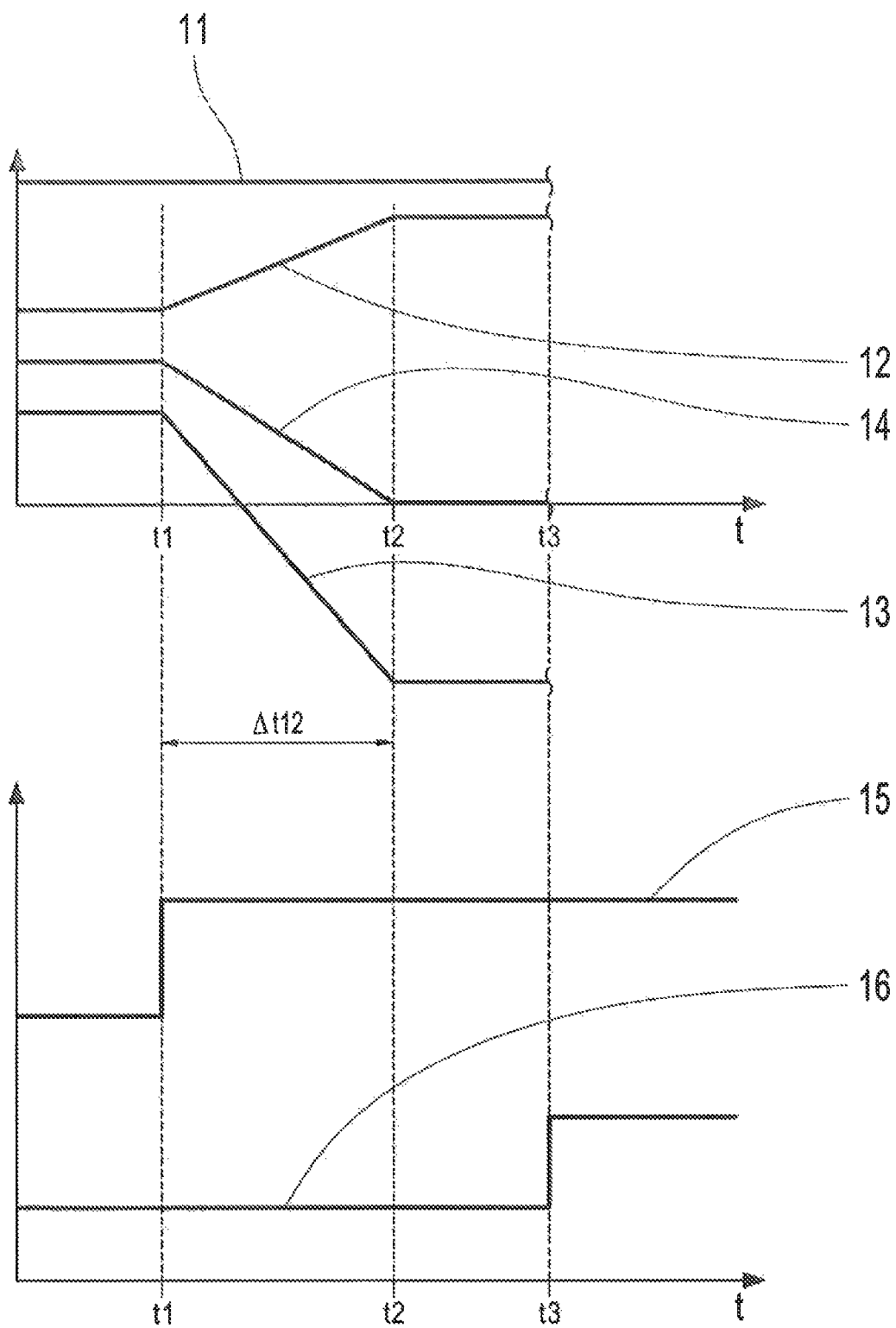
FIG. 2 is a first timing diagram to clarify the method in accordance with the invention.
Figure 3:
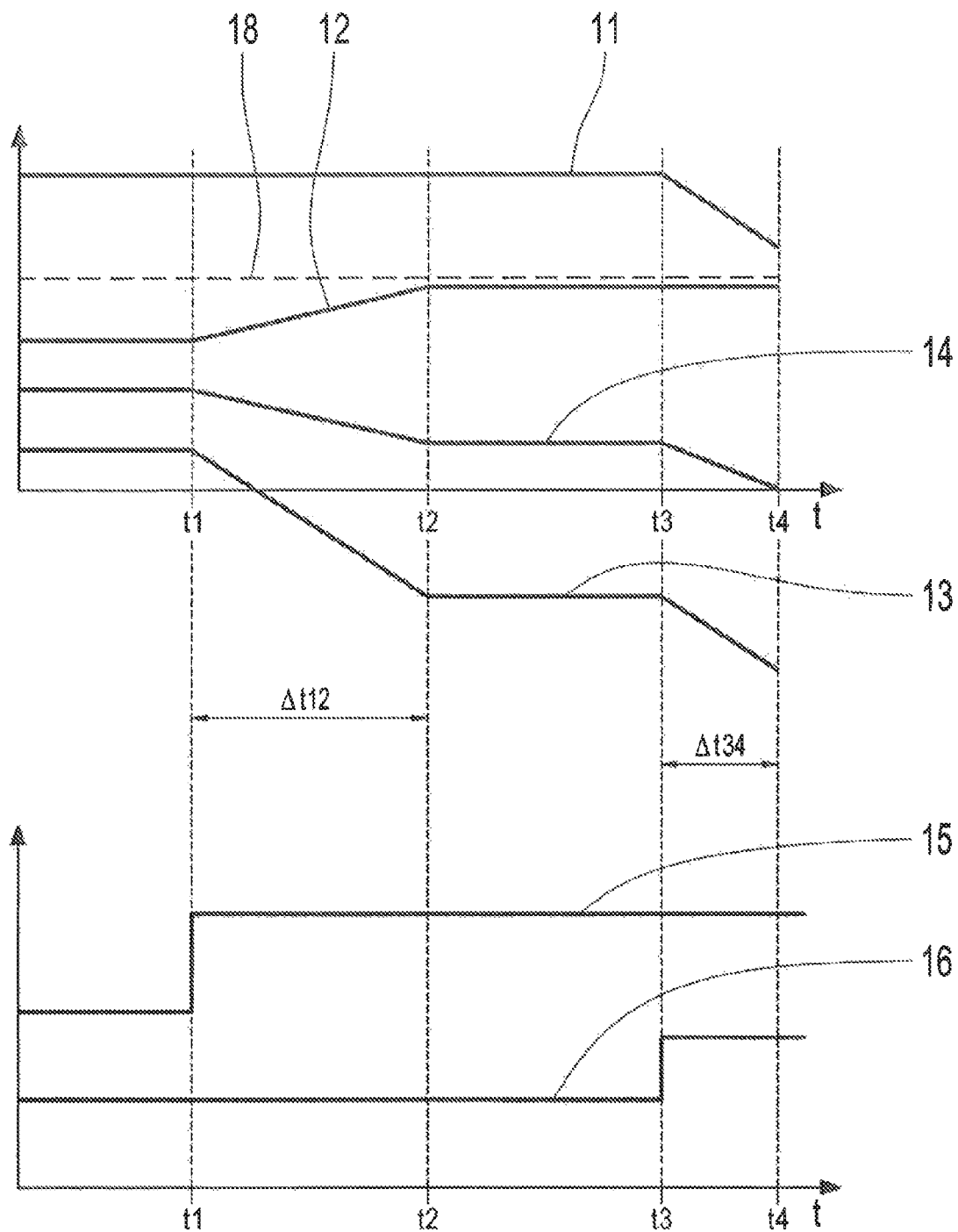
FIG. 3 is a second timing diagram to clarify the method in accordance with the invention.

Additional details of the method of the invention are described below with reference to the timing diagrams of FIGS. 2 and 3, whereas several chronological torque curves are shown in FIGS. 2 and 3 over time t.

The curve progression 11 shows a chronological curve of an output torque applying at the output 4, whereas the output torque depends on a driver's request. It is assumed that the driver's requested torque remains constant.

The curve progression 12 visualizes a chronological torque curve of the first drive assembly. 1

The curve progression 13 visualizes a chronological torque curve of the second drive assembly 2.

The curve progression 14 visualizes a chronological torque curve of the shift element 9 to be opened.

The curve progressions 15 and 16 correspond to signal progressions on the control side, whereas the signal progression 15 indicates the probability of a gearshift, and whereas the signal progression 16 visualizes the actual gearshift request.

In FIG. 2, a gear is engaged in the transmission 3 prior to the point in time t1; it is driven with a constant driver's requested torque 11, the torques 12 and 13 provided by the drive assemblies 12 and 13 are constant, as is the torque 14 that is transferred by a positive-locking shift element 9.

At the point in time t1, in accordance with the signal progression 15, if it is determined by a shifting strategy that the execution of a gearshift in the transmission is probable, the probability of a gearshift request is greater than a defined threshold. As such, starting from the point in time t1 between the points in time t1 and t2, through the change to the torques 12 and 13 provided by the drive assemblies 1 and 2, the positive-locking shift element 9 to be placed in a load-free condition for the gearshift probably to be executed is placed in a load-free condition in accordance with the signal progression 14. At the point in time t2, the shift element 9 to be opened for the gearshift probably to be executed does not transfer any further torque. At the point in time t3, the execution of a gearshift is actually requested on the control side. At such point in time, the shift element 9 to be opened is already in a load-free condition. As a result, the time required for executing the gearshift is minimized.

With the time span Δt12, FIG. 2 illustrates the time that can be saved in accordance with the invention upon the actual execution of a gearshift. In the time interval Δt12, prior to the actual gearshift request, in advance through the detection of a high gearshift probability, the positive-locking shift element 9 to be opened for the probable gearshift is placed in a load-free condition.

If, at point in time t1, the probability of a gearshift request is greater than a defined threshold, target torques are calculated on the control side for the drive assemblies 1, 2, with the aid of which the shift element 9 to be opened for the probable gearshift can be placed in a load-free condition, while maintaining the driver's requested torque at the output 4.

In this case, there is an examination of whether at least one of such target torques violates a torque limit of the respective drive assembly. If it is determined that, as is the case in the embodiment of FIG. 2, none of the target torques violates a corresponding torque limit of the respective drive assembly, the first and second drive assemblies 1, 2, in advance of the actual gearshift request, are guided preferably in a torque-controlled manner to the respective target torque while maintaining the drivers requested torque at the output 4.

However, if it is determined that at least one of the target torques violates a corresponding torque limit of the respective drive assembly, the shift element 9 to be opened is placed in a partially load-free condition in advance of the actual gearshift request. This is the case in the embodiment of FIG. 3, in which a torque limit 18 is shown for the drive assembly 1. At the point in time t2, the torque 12 provided by the drive assembly 1 reaches the torque limit 18, such that, subsequently, upon reaching this torque limit while maintaining the driver's requested torque 11 at the output 4, the torques 12, 13 provided by the drive assemblies 1, 2 are kept constant. The guiding of the torques 12, 13 between the points in time t1 and t2 is carried out on their corresponding end values, as described in the embodiment of FIG. 2, preferably in a torque-controlled manner, for example, along torque ramps.

In FIG. 3, an actual gearshift request in turn applies at the point in time t3, whereas, in FIG. 3, between the points in time t3 and t4, the shift element 9 to be opened is placed in a completely load-free condition. For this purpose, the torque 13 of that drive assembly that has not reached its torque limit is brought to a target torque in a torque-controlled manner, while maintaining an output torque that deviates from the driver's requested torque, such that, at the point in time t4, the shift element 9 to be opened for the gearshift to be executed is actually placed in a load-free condition.

Accordingly, in the embodiment of FIG. 3, after the actual applying of a gearshift request, the time span Δt34 is required for placing the positive-locking shift element 9 to be opened in a completely load-free condition. However, the time required for executing the gearshift can in turn be shortened by the time interval Δt12. In FIG. 3, at the point in time t4, the positive-locking shift element can be disengaged in a load-free condition, whereas, in FIG. 2, this can already be carried out at point in time t3 immediately upon the presence of the actual gearshift request.

Accordingly, it is within the meaning of the present invention that a shifting strategy determines the probability of a gearshift to be executed. If such a probability is greater than a threshold value, the shift element to be opened for the gearshift that is probably to be executed is placed in a load-free condition in advance, with no change to the output torque and thus the driver's requested torque. Only if the driver's requested torque is to change is the output torque actually applying at the output guided back to the driver's requested torque, naturally through influencing the torques provided by the drive assemblies. Through the placing without load in advance of a positive-locking shift element to be opened prior to the applying of an actual gearshift request, the time required for the execution of the gearshift can be minimized.

The present invention also relates to a control device 17 for carrying out the method. Such a control device 17 comprises tools on the hardware side and tools on the software side. The tools on the hardware side comprise interfaces, in order to exchange data with the component assemblies involved in the execution of the method. Furthermore, tools on the hardware side comprise a processor for processing data and a memory for storing data. The tools on the software side comprise program modules for carrying out the method in accordance with invention.

Modifications and variations can be made to the embodiments illustrated or described herein without departing from the scope and spirit of the invention as set forth in the appended claims.

REFERENCE SIGNS

1 First drive assembly
2 Second drive assembly
3 Transmission
4 Output
5 Planetary stage
6 First transmission shaft/transmission input shaft
7 Second transmission shaft
8 Transmission output shaft
9 Shift element
10 Separating clutch
11 Output torque curve
12 Torque curve of a first drive assembly
13 Torque curve of a second drive assembly
14 Torque curve of a shift element to be opened
15 Signal progression of a gearshift probability
16 Signal progression of a gearshift request
17 Control device
18 Torque limit

The invention claimed is:
1. A method for operating a drive train, wherein the drive train has:
a first drive assembly, and a second drive assembly;
a transmission including a plurality of shift elements;
an output;

wherein the first drive assembly acts on a first transmission shaft of the transmission, and the second drive assembly acts on a second transmission shaft of the transmission;

wherein an output torque depending on a drivers requested torque is provided at the output;

the method comprising:

for opening of one of the shift elements of the transmission upon a gearshift request, placing the shift element in a load-free condition by:

prior to the actual gearshift request, determining a probability of the gearshift request based on a shifting strategy;

if the probability of the gearshift request is greater than a defined threshold, a torque provided by the first drive assembly and a torque provided by the second drive assembly are changed in advance of the actual gearshift request while maintaining the driver's requested torque at the output; and wherein the change in torques is conducted in a manner such that a torque that is transferred by the shift element to be opened for the gearshift is reduced in order to minimize time required after the actual gearshift request for execution of the gearshift.

2. The method according to claim 1, further comprising:

calculating a target torque for each of the first drive assembly and the second drive assembly for the changing of the torques;

determining if the target torques violate a torque limit of the respective drive assembly;

if it is determined that none of the target torques violate the respective torque limits, the first and second drive assemblies are guided to the target torques in a torque-controlled manner in advance of the actual gearshift request while maintaining the driver's requested torque at the output; and if it is determined that at least one of the target torques violates the respective torque limit, the shift element to be opened is placed in a condition with reduced load in advance of the actual gearshift request.

3. The method according to claim 2, wherein if at least one of the target torques violates the respective torque limit, the first and second drive assemblies are guided in a torque-controlled manner towards their respective target torque until one of the drive assemblies reaches its torque limit, and, subsequently, the torques of the drive assemblies are kept constant.

4. The method according to claim 3, wherein, upon receipt of the actual gearshift request, the shift element to be opened is placed in a completely load-free condition by bringing the drive assembly that has not reached its torque limit in a torque-controlled manner to its respective target torque while deviating the output torque from the driver's requested torque.

5. The method according to claim 1, wherein the first transmission shaft on which the first drive assembly acts is a transmission input shaft, the second transmission shaft on which the second drive assembly acts is provided by a planetary stage of the transmission, and an output shaft of the transmission acts on the output.

6. The method according to claim 5, wherein the first drive assembly is one of an internal combustion engine or a first electric motor, and the second drive assembly is a second electric motor.

7. The method according to claim 1, wherein the shift element to be opened for the gearshift is a positive-locking shift element.

8. A control device for operating a drive train, wherein the drive train has:

a first drive assembly, and a second drive assembly;

a transmission including a plurality of shift elements;

an output;

wherein the first drive assembly acts on a first transmission shaft of the transmission, and the second drive assembly acts on a second transmission shaft of the transmission;

wherein an output torque depending on a driver's requested torque is provided at the output;

the control device configured with hardware and software to carry out the method according to claim 1.

* * * * *